Figure 4:
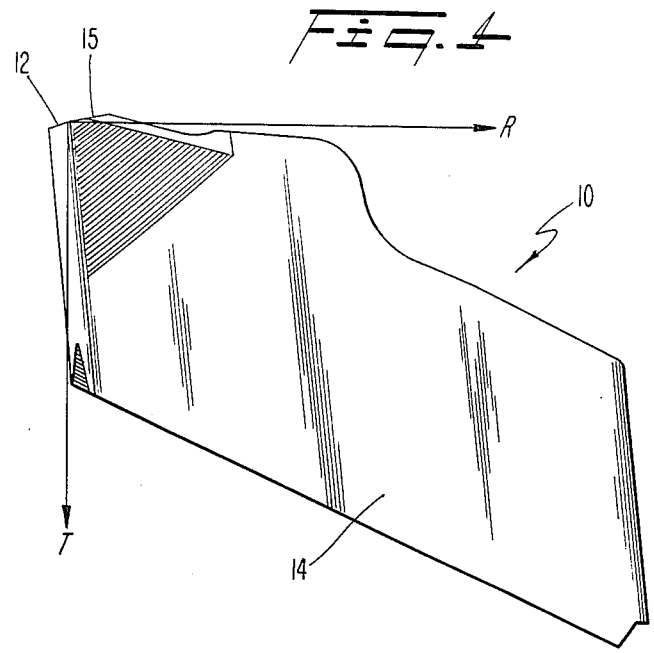

United States Patent [19]

Niemi

[11] Patent Number: 4,778,311

[45] Date of Patent: Oct. 18, 1988

[54] CUTTING INSERT

[75] Inventor: Matti O. Niemi, Fagersta, Sweden

[73] Assignee: Seco Tools AB, Fagersta, Sweden

[21] Appl. No.: 43,766

[22] Filed: Apr. 29, 1987

[30] Foreign Application Priority Data

May 7, 1986 [SE] Sweden .............................. 8602087

[51] Int. Cl.⁴ .............................................. B23P 15/28
[52] U.S. Cl. ...................................... 407/116; 407/117
[58] Field of Search ........................ 407/115, 116, 117

[56] References Cited

U.S. PATENT DOCUMENTS

| 2,176,265 | 10/1939 | Luers | 407/116 |
| 2,392,001 | 1/1946 | Raper | 407/116 |
| 2,677,170 | 5/1954 | Kuns et al. | 407/116 |
| 2,713,714 | 7/1955 | Krause | 407/116 |
| 2,891,300 | 6/1959 | Shephard | 407/116 |
| 4,159,885 | 7/1979 | Schott | 407/116 |

Primary Examiner—Frederick R. Schmidt
Assistant Examiner—Lawrence Cruz
Attorney, Agent, or Firm—Burns, Doane, Swecker & Mathis

[57] ABSTRACT

The present invention relates to a cutting insert (10;10';10";10''') adapted to be mounted in a holder (11), said insert (10;10';10";10''') being used for parting of details rotating about its longitudinal axis, e.g. rods and tubes, and that the insert has a leading cutting edge angle (H).

The characteristic for the invention is that the first face (15;15';15";15''') and/or the rake face (18;18';18";18''') are inclined in the transverse direction of the insert.

11 Claims, 4 Drawing Sheets

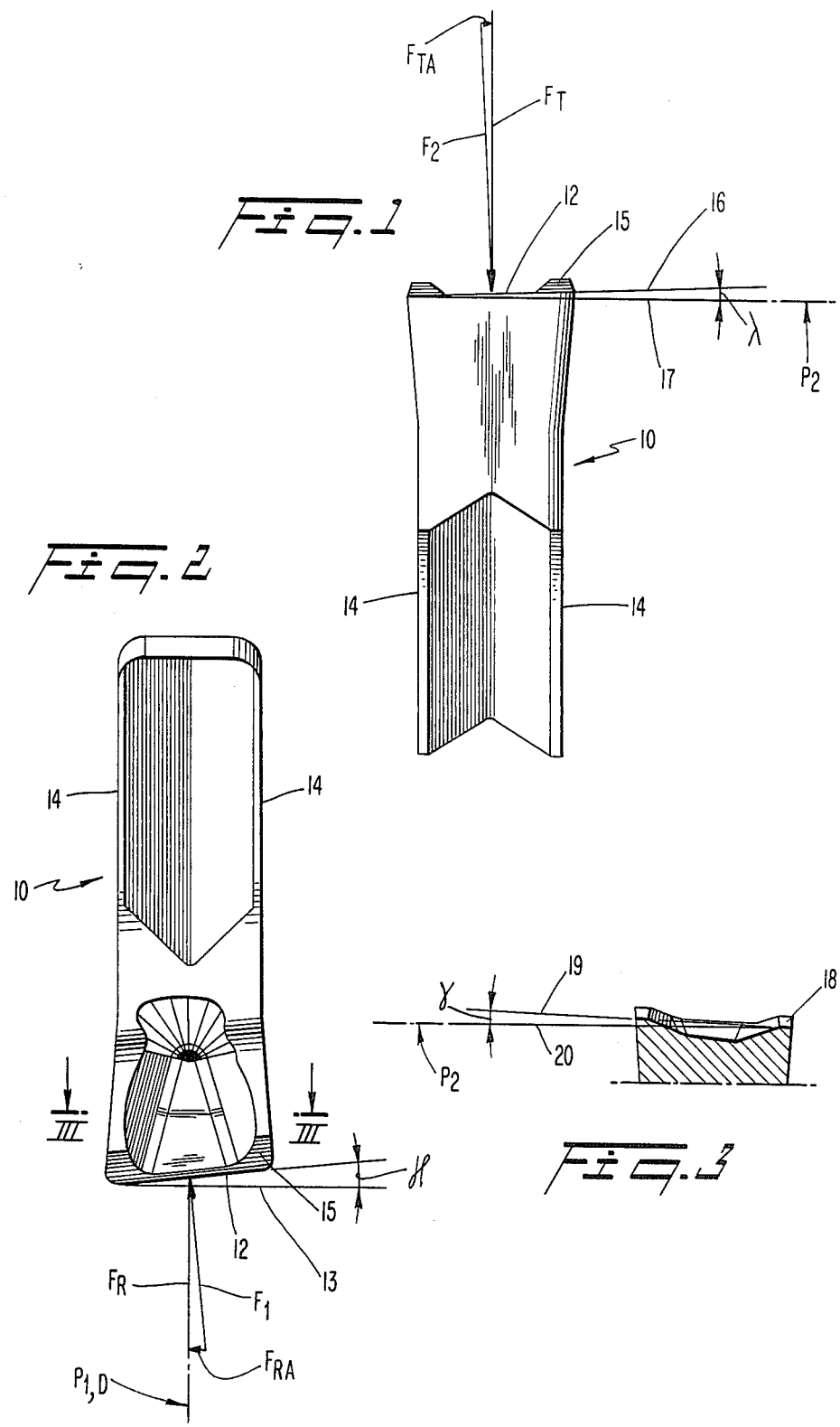

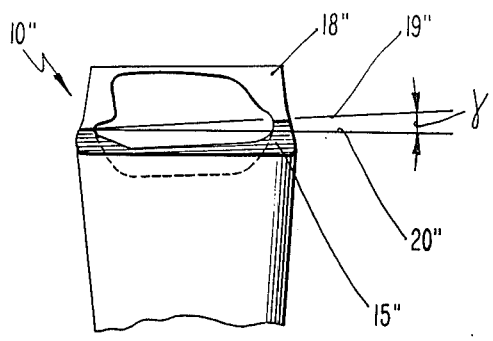
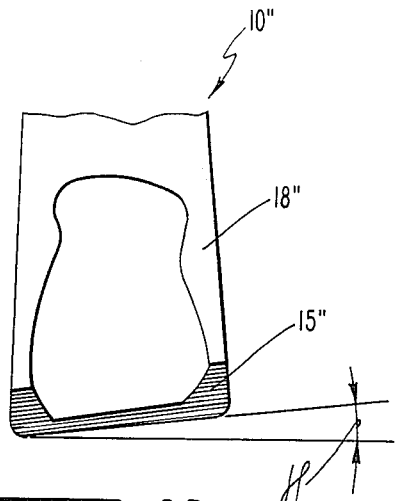
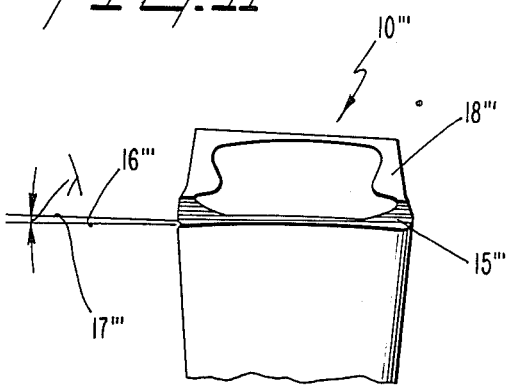
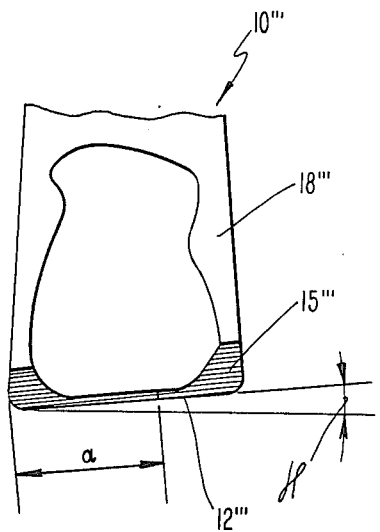

CUTTING INSERT

BACKGROUND OF THE INVENTION

The present invention relates to a cutting insert adapted to be mounted in a holder, said cutting insert being used for parting of details rotating about its longitudinal axia, e.g. rods and tubes, and said cutting insert having a certain leading cutting edge angle.

Parting tools are mainly used in order to cut off rods, tubes or other rotationally symmetrical details. It is often desirable tht the cut off details have such a surface finish that no further machining is necessary. To achieve such a surface finish parting tools are used that have a certain leading cutting edge angle. By such an arrangement none or just a minimal parting hub is created.

The leading cutting edge angle, however, causes a certain deflection in the axial direction of the cutting off insert. Said deflection is caused by a component force in axial direction, said component force emanating from the radial force. This is explained more in detail below.

The result from such a deflection is that unwanted chamfered end surfaces are achieved on the parted details.

The aim of the present invention is to present a cutting insert of the type mentioned above, said insert when used for parting creating planar end surfaces having a good surface finish.

THE DRAWING

Figure 5:
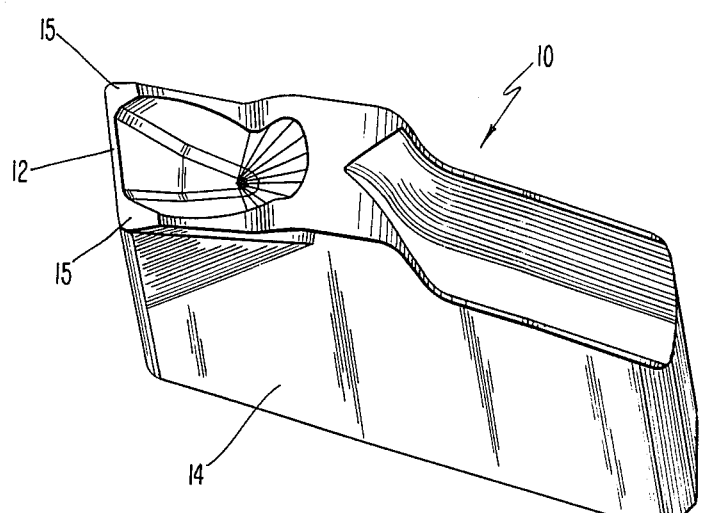
Figure 6:
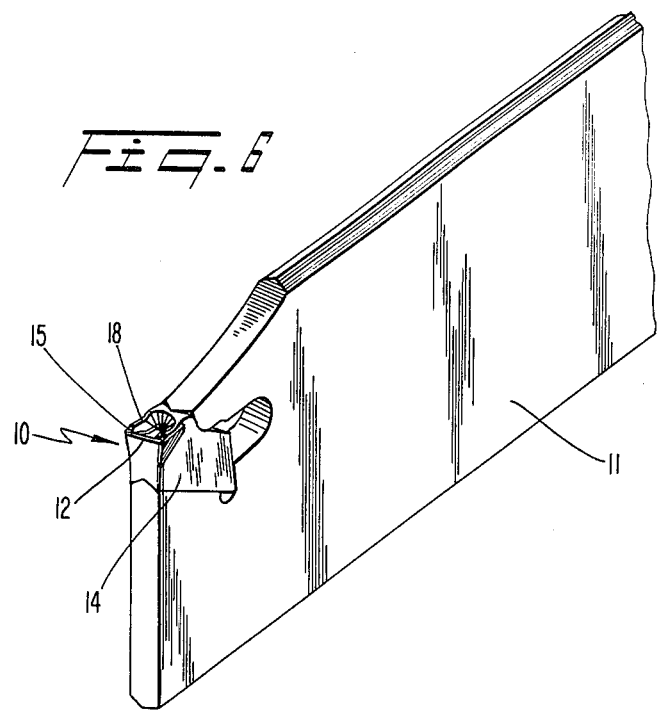
Figures 7, 8:
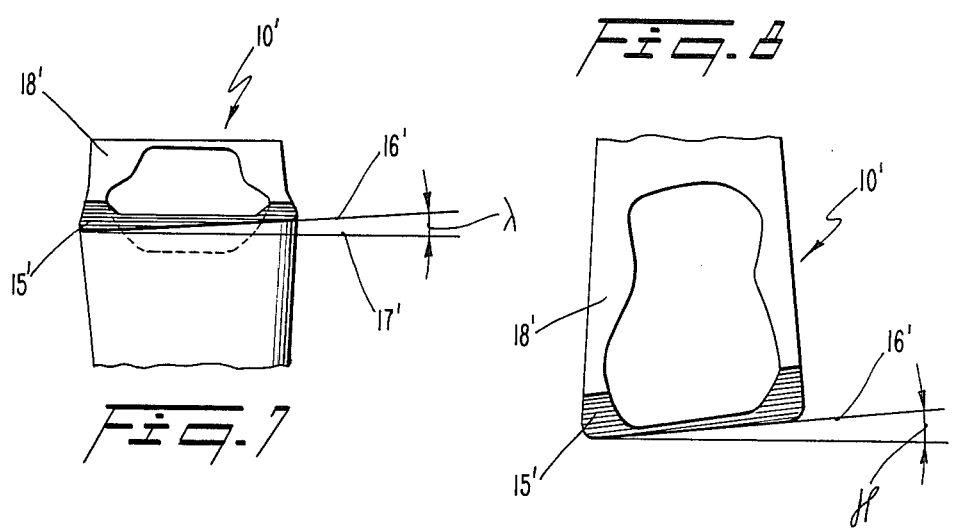

Below a number of embodiments of the invention will be described, reference being made to the accompanying drawings. In the drawings FIG. 1 discloses an end view of a cutting insert according to the present invention;

FIG. 2 discloses a top view of a cutting insert according to FIG. 1;

FIG. 3 discloses a portion of a section along III—III in FIG. 2;

FIG. 4 discloses a side view of a cutting insert according to FIG. 1;

FIG. 5 discloses a perspective view from above of a cutting insert according to FIG. 1;

FIG. 6 discloses a perspective view having the cutting insert mounted in a holder;

FIG. 7 discloses a front view of an alternative embodiment of the invention;

FIG. 8 discloses a top view of the embodiment according to FIG. 7;

FIG. 9 discloses a front view of a further alternative embodiment of the invention;

FIG. 10 discloses a top view of the embodiment according to FIG. 9;

FIG. 11 discloses still a further embodiment of the invention; and

FIG. 12 discloses a top view of the embodiment according to FIG. 11.

The indexable insert 10 defines a front-to-rear direction D which lies in both a first imaginary plane P1 that bisects the insert and intersects the cutting edge, and a second imaginary plane P2 oriented perpendicular to the first imaginary plane P1. The insert further comprises a chamfered cutting edge 12 that is most clearly disclosed in FIG. 2. The cutting edge 12, that thus is not located in the plane of the paper in FIG. 2, forms a first angle H with a line 13 located in the plane of the paper in FIG. 2 and disposed perpendicular to the side walls 14 of the cutting insert 10. To sum up one can say that the cutting edge 12 forms a certain leading cutting edge angle relative to a line 13 lying in the second plane P2 and extending perpendicular to the first plane P1.

The radial cutting force $F_1$ that acts on the cutting insert 10 in the plane of the paper in FIG. 2 can due to the chamfered cutting edge 12 be divided into a component force $F_R$ in the radial direction and a component force $F_{RA}$ in the axial direction, the last-mentioned component force $F_{RA}$ tending to deflect the leading part of the insert 10 to the left in FIG. 2. As discussed above, this can result in the formation of unwanted chamfered end faces on the parted details.

As is most apparent from FIG. 1 the first face 15 of the indexable insert has been inclined and thus a line 16 that lies in the plane of the first face 15 and is parallel to the cutting edge 12 forms a second acute angle $\lambda$ with line 17 when viewed from the top (FIG. 2) of the insert 10 in its working position lying in the plane of the paper in superposed relation with the cutting edge 12 and being perpendicular to the tangential direction (T) (see FIG. 4) of the insert in its working position. The line 17 lies in the second imaginary plane P2. Thus, the cutting edge 12 forms the second angle $\lambda$ with the second imaginary plane P2 as viewed in FIG. 1. The inclined first face 15 dictates that the tangential cutting force $F_2$ be divided into a component force $F_T$ in the tangential direction and a component force $F_{TA}$ in the axial direction, said last-mentioned component force $F_{TA}$ having a direction opposite to the component force $F_{RA}$.

From FIG. 1 it can be learned that $F_{TA} = F_T \cdot \tan \lambda$. The angle $\lambda$ is preferably given such a value that the size of $F_{TA}$ is the same as the size of $F_{RA}$ that has a direction opposite to $F_{TA}$. This means that $F_{TA}$ and $F_{RA}$ will counterbalance each other and thus the unwanted deflection of the leading part of the insert 10 is avoided.

Empirically it has been found that the component $F_R$ and the component $F_T$ have the following relationship:

$$F_R \approx 0.6 F_T.$$

Provided that $F_{RA} = F_{TA}$ the angle $\lambda$ can be calculated in the following way:

$$F_{RA} = F_{TA} = F_R \cdot \tan = F_T \cdot \tan \lambda;$$

$$\frac{F_R}{F_T} \cdot \tan = \tan \lambda.$$

If $$\frac{F_R}{F_T} \approx 0.6$$

is inserted the following relation exists:

$$0.6 \cdot \tan H = \tan \lambda$$

$$\lambda = \arctan (0.6 \cdot \tan H).$$

When closing a suitable value for H practical tests have shown that H=6° gives acceptable effect when trying to avoid cutting off hubs and also that this value for the leading setting angle of the cutting insert 12 is possible to counterbalance.

If H is chosen equal to 6° $\lambda = 3.6°$, and this means that the edges of the first face 15 are located at different height levels.

It has turned out that the difference in height created by $\lambda=3.6°$ in an insert of the present type and of ordinary size causes machining problems. According to the embodiment of FIGS. 1 to 6 a smaller inclination is chosen for the first face 15 and $\lambda=2°$ has been found to be a suitable value. For a cutting width of 3 mm the difference in heigt is: 3 arc tan $2° \approx 0.10$ mm. This is an acceptable value.

However, in order to provide a complete counterbalancing of the axial component forces $F_{RA}$ and $F_{TA}$ the rake face 18 must be inclined to a greater extent than the first face 15, the inclination of the rake face 18 being symbolized by a third acute angle $\gamma$ in FIG. 3 between a line 19 that lies in the plane of the rake face 18 and when viewed from the top (FIG. 2) appears parallel to the cutting edge 12, and a line 20 that in top view also appears parallel to the cutting edge 12 and that is also perpendicular to the tangential direction (T) of the insert 10 (see FIG. 4) in its working position. That is, the line 20 lies in the second imaginary plane P2, so the rake face 18 forms the third acute angle with the second plane P2.

To what extent the inclination of the rake face 18 will exceed the inclination of the first face 15 is preferably determined by practical tests. For the embodiment discussed above it has turned out that an inclination of about 5° for the rake face 18 is convenient if the first face 15 has an inclination of about 2° and the leading cutting edge angle H is about 6°.

The values of the different parameters discussed above in connection with the description of the embodiment only constitute a preferred embodiment within the scope of the invention. Thus the different angles can be varied due to different influencing factors, e.g. the dimension of the insert, material, field of application and so on.

Without in any way limiting the principle idea of the present invention the following preferred intervals for the different angles can be mentioned.

The leading setting angle H is preferably in the magnitude of 4° to 8°. The angle of inclination $\gamma$ for the first face 15 is preferably in the magnitude of 1° to 4°. The angle of inclination $\gamma$ for the rake face 18 is preferably in the magnitude if 4° to 70°.

Within the scope of the invention a number of further embodiments are possible. A few of these embodiments will be described below with reference to FIGS. 7-12. All of these embodiments have a cutting edge angle H.

The embodiment of FIGS. 7 and 8 has a first face 15' having an inclination angle $\lambda$ between the lines 16' and 17' in accordance with the embodiment of FIGS. 1 to 5. However, the rake face 18' of the cutting insert 10' has no inclination.

The embodiment of FIGS. 7 and 8 does not provide any complete counterbalancing of the forces in the radial and axial direction due to the problems discussed above.

In the embodiment of FIGS. 9 and 10 the cutting insert 10'' has a rake face 18'' having an inclination angle $\gamma$ between the lines 19' and 20'' in accordance with the embodiment of FIGS. 1 to 5. However, the first face 15'' of the cutting insert 10' has no inclination.

In the embodiment of FIGS. 11 and 12 the first face 15''' has an inclination angle $\lambda$ between the lines 16''' and 17''' for only a part of the first face 15'''. From FIG. 12 it can be learned that the inclined part of the first face 15''' corresponds to the distance "a" along the cutting edge 12'''.

In the embodiment the rake face 18'''' can either be inclined or not.

The principle idea of the present invention is to design the geometry of the cutting insert 10; 10'; 10''; 10''' in such a way that the apparent forces in the radical and tangential directions are counterbalanced at least to a certain extent in the axial direction of the parted detail. The embodiments described above refer to an indexable insert. However, the invention is also applicable to parting tools having fixed inserts. Also the holder 11 and its structure for clamping the insert do not constitute any part of the present invention.

I claim:

1. A cutting insert adapted to be mounted in a holder and including a cutting edge for parting a rotary workpiece; said insert defining a front-to-rear direction which lies in both first and second planes, said first imaginary plane bisecting said insert and intersecting said cutting edge, said second imaginary plane oriented perpendicularly to said first imaginary plane; said cutting edge disposed at a front end of said insert and forming a first acute angle with a line which lies in said second imaginary plane and which extends perpendicular to said first plane as viewed in a direction perpendicular to said second imaginary plane; said first acute angle constituting a leading angle of said cutting edge resulting in said cutting edge being acted upon by a first reaction force having a first component directed perpendicular to said first imaginary plane as viewed in a direction perpendicular to said second imaginary plane; at least a portion of said cutting edge forming a second acute angle with said second imaginary plane, said second acute angle oriented such that said cutting edge is acted upon by a second reaction force having a second component opposing said first component to counteract at least a portion of said first component.

2. Insert according to claim 1, wherein all of said cutting edge extends at said acute second angle.

3. Insert according to claim 1, wherein only a portion of said cutting extends at said acute second angle.

4. Insert according to claim 1, wherein said first acute angle is from 4 to 8 degrees.

5. Insert according to claim 4, wherein said first acute angle is 6 degrees.

6. Insert according to claim 1, wherein said second acute angle is from 1 to 4 degrees.

7. Insert according to claim 6, wherein said second acute angle is 2 degrees.

8. Insert according to claim 1, wherein said cutting edge lies on a first face disposed on a top of said insert, there being a rake face behind said first face, said rake face forming a third acute angle with said second imaginary plane, said third acute angle being greater than said second acute angle.

9. Insert according to claim 8, wherein said third acute angle is from 4 to 7 degrees and said second acute angle is from 1 to 3 degrees.

10. Insert according to claim 9, wherein said third acute angle is 5 degrees and said second acute angle is 2 degrees.

11. A cutting insert adapted to be mounted in a holder and including a cutting edge for parting a rotary workpiece; said insert defining a front-to-rear direction which lies in both first and second planes, said first imaginary plane bisecting said insert and intersecting said cutting edge, said second imaginaary plane oriented perpendicularly to said first imaginary plane; said cutting edge disposed at a front end of said insert and forming a first acute angle with a line which lies in said second imaginary plane and which extends perpendicular to said first plane as viewed in a direction perpendicular to said second imaginary plane; said first acute angle constituting a leading angle of said cutting edge resulting in said cutting edge being acted upon by a first reaction force having a first component directed perpendicular to said first imaginary plane as viewed in a direction perpendicular to said second imaginary plane; said cutting edge lying on a first face disposed on a top of said insert, a rake face disposed behind said cutting edge and forming an additional acute angle with said second imaginary plane, said additional acute angle resulting in said rake face being acted upon by an additional reaction force having a component opposing said first component to counteract at least a portion of said first component.

* * * * *